United States Patent
Bouillet

(10) Patent No.: US 10,021,593 B2
(45) Date of Patent: Jul. 10, 2018

(54) MULTIUSER WIFI BANDWIDTH ALLOCATION METHOD AND APPARATUS

(71) Applicant: THOMSON LICENSING, Issy les Moulineaux (FR)

(72) Inventor: Aaron Reel Bouillet, Noblesville, IN (US)

(73) Assignee: Thomson Licensing (FR)

( * ) Notice: Subject to any disclaimer, the term of this patent is extended or adjusted under 35 U.S.C. 154(b) by 46 days.

(21) Appl. No.: 15/112,956

(22) PCT Filed: Jan. 29, 2014

(86) PCT No.: PCT/US2014/013487
§ 371 (c)(1),
(2) Date: Jul. 20, 2016

(87) PCT Pub. No.: WO2015/116042
PCT Pub. Date: Aug. 6, 2015

(65) Prior Publication Data
US 2016/0345197 A1    Nov. 24, 2016

(51) Int. Cl.
| H04L 12/803 | (2013.01) |
| H04W 28/06 | (2009.01) |
| H04L 12/801 | (2013.01) |
| H04L 12/911 | (2013.01) |
| H04L 29/08 | (2006.01) |

(Continued)

(52) U.S. Cl.
CPC ............ *H04W 28/06* (2013.01); *H04L 47/11* (2013.01); *H04L 47/822* (2013.01); *H04L 69/323* (2013.01); *H04W 8/18* (2013.01); *H04W 24/08* (2013.01); *H04W 28/0268* (2013.01);

(Continued)

(58) Field of Classification Search
CPC ... H04L 47/824; H04L 47/822; H04L 47/781; H04L 47/70; H04L 47/20; H04L 47/22; H04L 47/125; H04L 2209/80; H04L 63/105; H04L 9/32; H04W 72/10;

(Continued)

(56) References Cited

U.S. PATENT DOCUMENTS

2003/0212787 A1    11/2003   Qiu et al.
2008/0250478 A1 *  10/2008   Miller ..................... H04L 9/32
                                                                    726/5

(Continued)

FOREIGN PATENT DOCUMENTS

JP    2004064536 A    2/2004
JP    2006191523 A    7/2006

OTHER PUBLICATIONS

Search Report for Int'l Application No. PCT/US2014/013487 dated Sep. 25, 2014.

(Continued)

*Primary Examiner* — Jung-Jen Liu
(74) *Attorney, Agent, or Firm* — Jack Schwartz & Associates, PLLC

(57) ABSTRACT

A method for controlling data throughput of a public user at a subscriber access point, including determining if the public user has established a connection at the subscriber access point, measuring the physical layer data rate of the public user retrieving a maximum channel usage time limit and limiting an amount of data transferred on a per unit of time basis responsive to the measured physical data rate and the maximum channel usage time limit.

9 Claims, 2 Drawing Sheets

(51) Int. Cl.
*H04W 8/18* (2009.01)
*H04W 24/08* (2009.01)
*H04W 28/02* (2009.01)
*H04W 72/08* (2009.01)
*H04W 76/10* (2018.01)
*H04W 84/12* (2009.01)
*H04W 88/08* (2009.01)

(52) U.S. Cl.
CPC ......... *H04W 72/085* (2013.01); *H04W 76/10* (2018.02); *H04W 84/12* (2013.01); *H04W 88/08* (2013.01)

(58) Field of Classification Search
CPC . H04W 84/12; H04W 12/08; H04W 28/0231; H04W 24/08; H04W 12/06
See application file for complete search history.

(56) References Cited

U.S. PATENT DOCUMENTS

| | | |
|---|---|---|
| 2011/0261740 A1 | 10/2011 | Loc et al. |
| 2016/0043953 A1* | 2/2016 | Ringland .......... H04W 28/0231 370/230 |
| 2017/0006504 A1* | 1/2017 | Townend .............. H04W 28/22 |

OTHER PUBLICATIONS

Japanese Patent Office Notice of Reasons for Rejection in corresponding Japanese patent application No. 2016-548679 dated Feb. 27, 2018.

* cited by examiner

MULTIUSER WIFI BANDWIDTH ALLOCATION METHOD AND APPARATUS

This application claims the benefit, under 35 U.S.C. § 365 of International Application PCT/US14/13487, filed 29 Jan. 2014, which was published in accordance with PCT Article 21(2) on 6 Aug. 2015 in English.

FIELD OF THE INVENTION

The present invention is related to bandwidth allocation, and in particular, the present invention dynamically limits the bandwidth allocated to each WiFi client based on the physical layer connection quality so that clients with poor connection quality do not adversely reduce the overall link quality.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

As used herein the term "client" includes but is not limited to stations, client stations, mobile stations, mobile terminals, mobile devices, nodes, laptop computers (laptops), notebook computers (notebooks), personal digital assistants (PDAs), dual mode smart phones, iPhones, iPods, iPads, tablets or any other wireless devices that can be connected to a network.

With multiple clients connected to a wireless router, gateway or access point (AP), ideally all clients would be connected with high link quality so high rate modulation schemes can be used. In this case, each client utilizes a short duration of time to transmit or receive data. If one client, however, has poor connection quality, a low-rate modulation scheme must be used. A low or lower-rate modulation scheme means that a longer time will be needed to transmit or receive an equivalent amount of data. As such, the client with poor link quality (a poor connection) will require a disproportionate amount of the available time for its communication, leaving reduced channel capacity for the remaining clients with good link quality (a good connection).

Various Quality of Service (QoS) mechanisms are known in the prior art but these QoS mechanisms are based on service quality categories that are setup in advance. None of these QoS mechanisms specifically address the issue of WiFi congestion as a function of link quality.

SUMMARY OF THE INVENTION

With multiple clients connected to a wireless router, gateway or access point (AP), ideally all clients would be connected with high link quality so high rate modulation schemes can be used. In this case, each client utilizes a short duration of time to transmit or receive data. If one client, however, has poor connection quality, a low-rate modulation scheme must be used. A low or lower-rate modulation scheme means that a longer time will be needed to transmit or receive an equivalent amount of data. As such, the client with poor link quality (a poor connection) will require a disproportionate amount of the available time for its communication, leaving reduced channel capacity for the remaining clients with good link quality (a good connection).

The present invention dynamically limits the amount of data any given client can transmit or receive (for example, a client with poor link quality) so that client uses the channel less than an adjustable percentage per unit time.

A method for controlling data throughput of a public user at a subscriber access point, including determining if the public user has established a connection at the subscriber access point, measuring the physical layer data rate of the public user, retrieving a maximum usage time limit and limiting the amount of data transferred on a per unit time basis responsive to the measured physical data rate and the maximum usage time limit.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The present invention couples the data bandwidth allocation to the physical layer link rate. If there is a client that has a low link rate, then its bandwidth is reduced so that it will be active on the channel for less time on average. If the link rate improves, perhaps by the client moving closer to an access point, the data bandwidth may be increased. In this way, the average amount of time a single client is allowed (permitted) to monopolize the communication channel is kept (maintained) below a target duration. This duration may be different depending upon classes of clients.

Clients may be assigned to different classes by the service provider. For example, service providers like Comcast are enabling hotspot functionality in customer premises equipment (access points). A private subscriber who owns a particular access point may be classified as a high priority client so would be given a longer channel duration limit. A user connecting to the private subscriber's access point would be classified as a lower priority client so would be given a shorter channel duration limit. In this way, even if a public client (user), had a low physical layer link rate connection, that would not adversely impact the throughput of the private subscriber having a hotspot (access point). It is contemplated that the present invention would be based on averages of the physical layer connection rate with appropriate time constraints as might be needed in specific situations involving specific numbers of clients.

It is also contemplated that the parameters governing the limits for different classes of clients could themselves be adaptive.

It may also be useful to be able to enable and disable the data bandwidth method of the present invention for certain or all classes of clients based on more global bandwidth usage patterns.

The following is an example of the present invention. If the maximum data bandwidth allowed (permitted) for a client is 4 Mb/s, let the maximum channel usage time limit be 10%, for example. Then the data bandwidth limit would be scaled according to the following chart:

|  | Connection rate (Mb/s) | | | | | | |
| --- | --- | --- | --- | --- | --- | --- | --- |
|  | 6 | 12 | 18 | 24 | 36 | 48 | 54 |
| Data bandwidth limit (Mb/s) | 0.6 | 1.2 | 1.8 | 2.4 | 3.6 | 4.0 | 4.0 |

The present invention is implemented at access points that act as hotspots for public users. That is, the present invention would be delivered as part of a private subscriber's (customer's) premises equipment (access point).

Figure 1:
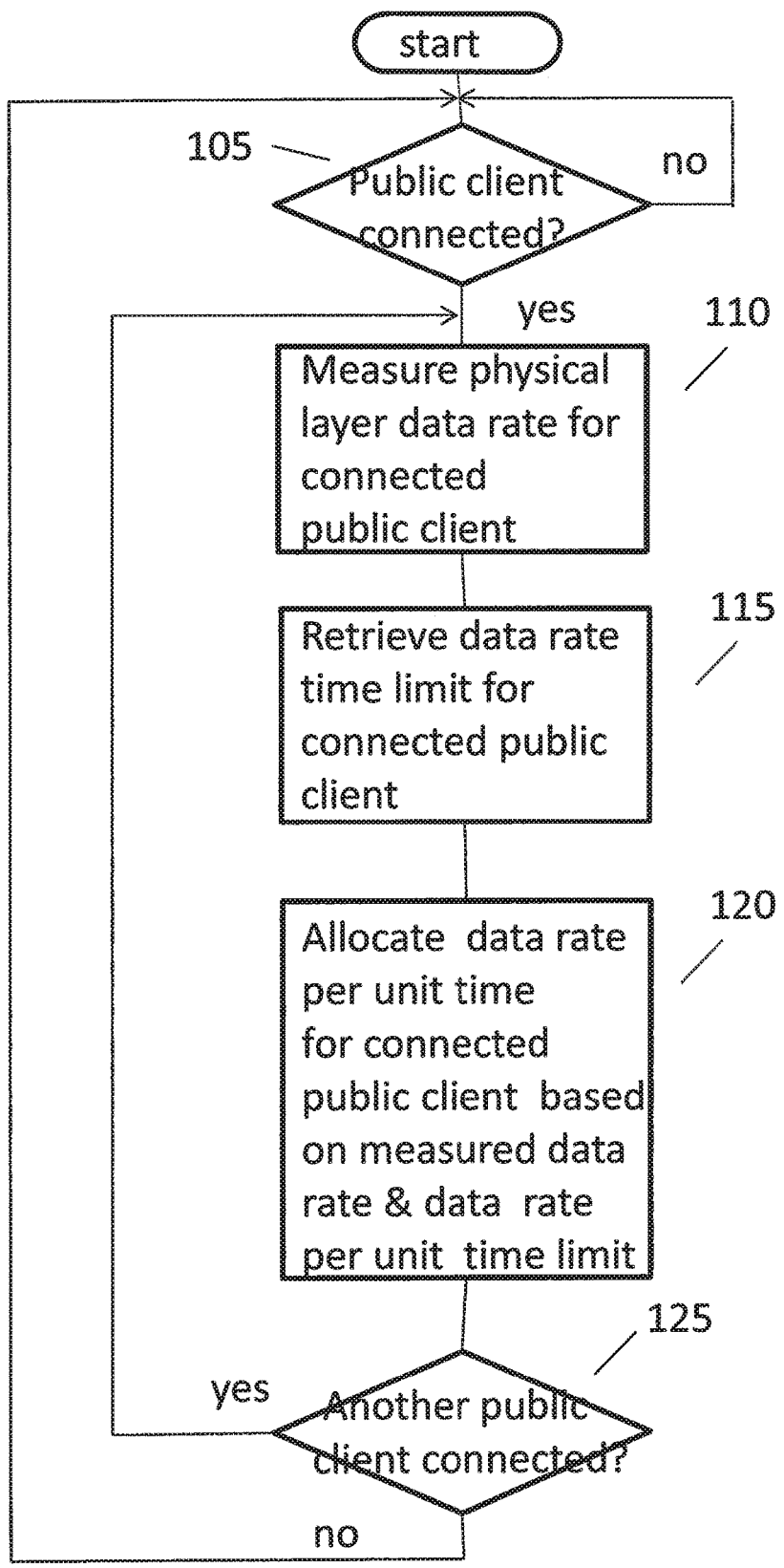
FIG. 1 is a flowchart of an exemplary embodiment of a subscriber's access point of the present invention.

FIG. 1 is a flowchart of an exemplary embodiment of a subscriber's access point of the present invention. At 105, the data rate time limit allocation module performs a test to determine if a public user (client) has connected to the subscriber's access point (equipment). If no public user has connected to the subscriber's access point then processing returns to 105 until a public user connects to the subscriber's access point. If a public user has connected to the subscriber's access point, then at 110, the subscriber's access point measures the physical data rate for the public client. At 115, the subscriber's access point retrieves the data rate for the connected public user from a storage system. The present invention contemplates that the data rate time limit is based on averages of the physical layer connection rate as well as limits for different classes of clients. Since the limits for different classes of clients may be adaptive, it is further contemplated that there is an interface to the service provider so that the service provider may update the data rate usage time limit data base. The service provider may also be able to enable or disable the data bandwidth for certain classes of clients based on global usage patterns. This also may also require updates to the data base from the service provider. At 120, the subscriber's access point allocates the data rate per unit of time for the connected public user based on the measured data rate and the data rate usage time limit retrieved from the data base. At 125, the subscriber's access point performs a test to determine if another public user has connected to the subscriber's access point or if an already connected public user's physical layer data rate has changed (either increased or decreased). If no other public user has connected to the subscriber's access point or if an already connected public user's physical layer data rate has changed (either increased or decreased) then processing proceeds to 105. If another public user has connected to the subscriber's access point then processing proceeds to 110.

Figure 2:
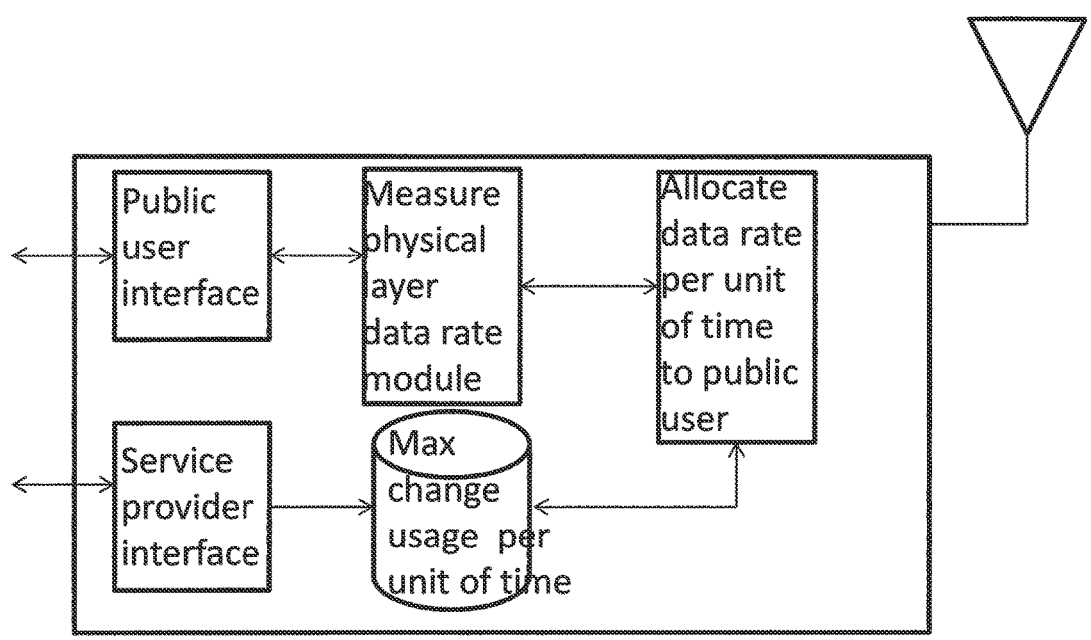
FIG. 2 is a block diagram of an exemplary embodiment of a subscriber's access point of the present invention.

FIG. 2 is a block diagram of an exemplary embodiment of a subscriber's access point of the present invention. There is a public user interface for a public user to access the subscriber's access point (hotspot). The public user is able to bi-directionally communicate with the subscriber's access point (hotspot). The public user interface is bi-directionally in communication with the measure physical data rate module. The measure physical data rate module measure the physical layer data rate for the connected public user. The measure physical data rate module is bi-directionally in communication with the allocate data rate per unit of time module. The allocate data rate per unit of time module allocates the data rate usage per unit of time to the connected public user based on the measured physical layer data rate and a usage time limit retrieved from a storage system. The allocate data rate per unit of time module is in bi-directional communication with the storage system. There is a service provider interface for the service provider to update the maximum usage per unit of time data base.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for limiting an amount of data transferred at a subscriber access point, said method comprising:
   determining if a connection has been established with said subscriber access point;
   measuring a physical layer data rate of said connection;
   retrieving a maximum data rate usage time limit from a storage, said maximum data rate usage time limit being based on at least averages of physical layer data rates; and
   allocating a data rate per unit of time based on said measured physical layer data rate and said maximum data rate usage time limit by reducing a bandwidth for connections having a physical layer data rate below a level.

2. The method according to claim 1, further comprising determining if there are additional public users which have established connections with said subscriber access point or if an already connected public user's physical layer data rate has changed.

3. The method according to claim 2, wherein said steps of measuring, retrieving and allocating are repeated if there are additional public users which have established connections with said subscriber access point or if an already connected public user's physical layer data rate has changed.

4. The method according to claim 1, wherein said subscriber's access point is a private access point.

5. The method according to claim 4, wherein said private subscriber's access point behaves as a public hotspot.

6. A subscriber access point for limiting an amount of data transferred at said subscriber access point, comprising:

a bi-directional user interface for establishing a connection;

a module to measure a physical layer data rate of said connection, said module to measure a physical layer data rate of said connection in bi-directional communication with said bi-directional user interface;

a storage system including a maximum data rate usage time limit, said maximum data rate usage time limit being based on at least averages of physical layer data rates; and a module to allocate a data rate per unit of time, said module to allocate the data rate per unit of time in bi-directional communication with said module to measure said physical layer data rate of said connection and also in bi-directional communication with said storage system, said module to allocate said amount of said data rate per unit of time allocating a data rate per unit of time based on said measured physical layer data rate and said maximum data rate usage time limit by reducing a bandwidth for connections having a physical layer data rate below a level.

7. The subscriber access point according to claim 6 further comprising a service provider interface for updating said maximum data usage time limit.

8. The subscriber access point according to claim 6, wherein said subscriber access point is a private access point.

9. The subscriber access point according to claim 8, wherein said private subscriber access point behaves as a public hotspot.

* * * * *